July 25, 1944.  D. M. PHILLIPS  2,354,416
SWING JOINT
Filed May 4, 1943
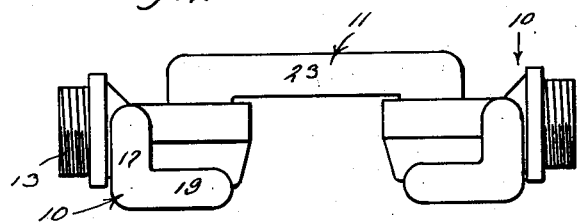
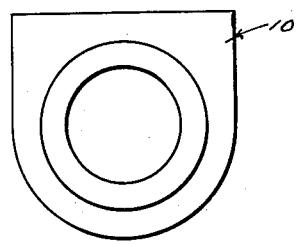
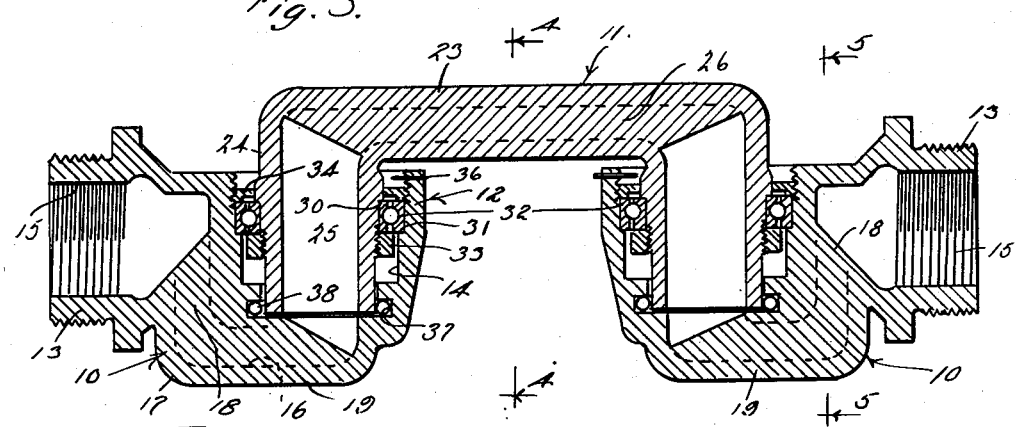
Inventor
Dwight M Phillips
by [signature]
Attorney Patented July 25, 1944

2,354,416

UNITED STATES PATENT OFFICE 2,354,416

SWING JOINT

Dwight M. Phillips, Fullerton, Calif., assignor to Chiksan Tool Company, Brea, Calif., a corporation of California Application May 4, 1943, Serial No. 485,611

12 Claims. (Cl. 285—9)

This invention relates to fluid conduits and fluid handling systems and relates more particularly to swing joints for use in the pressure lines of hydraulic brake systems of the character employed in aircraft, etc. A general object of this invention is to provide an effective, dependable and very compact swing joint for use in a fluid line or system.

Another object of this invention is to provide a swing joint particularly well adapted for installation in situations where the available space is very limited. The transverse dimension of the joint of this invention need be only slightly greater than the diameter of the line or conduit in which it is connected.

Another object of this invention is to provide a swing joint of the character referred to that permits a substantial relative swinging movement of the connected pipe parts.

Another object of this invention is to provide a swing joint of the character referred to in which the fluid conduction sections are transversely elongated in one direction and flattened in the other direction to materially reduce the over all diametric or transverse dimensions of the joint and are internally reinforced to possess the required strength.

Another object of this invention is to provide a swing joint that embodies three sections connected one with the other for free relative pivotal or swinging movement by simple, dependable anti-friction connections.

The various objects and features of my invention will be fully understood from the following detailed description of a typical preferred form and application of the invention, throughout which description reference is made to the accompanying drawing, in which:

Fig. 1 is a side elevation of the swing joint provided by this invention. Fig. 2 is an enlarged end view of the swing joint. Fig. 3 is an enlarged longitudinal detailed sectional view of the joint, and Figs. 4 and 5 are transverse detailed sectional views taken as indicated by lines 4—4 and 5—5, respectively, on Fig. 3.

The improved swing joint of the present invention may be said to comprise, generally, two end sections 10, an intermediate section 11, and anti-friction means 12 connecting the end sections 10 and the intermediate section 11 for free relative swinging movement.

The end sections 10 of the joint are adapted to be connected with fluid handling parts of the conduit or system in which the joint is to be used. In the construction illustrated the end sections 10 have threaded parts 13 on their outer ends to facilitate their connecion with the pipes or other parts of the system. The two end sections 10 are alike or complementary and are shaped to receive the end portions of the intermediate section 11 and to serve as fluid conductors. Sockets 14 are formed in the inner portions of the end sections 10 to receive parts of the intermediate section 11. The longitudinal axes of the sockets 14 are at right angles to the longitudinal axes of the threaded outer parts 13 and of the general joint structure. The two sections 10 are arranged with their sockets 14 facing in the same direction and in parallel relation. Fluid conducting openings extend through the sections 10 from their outer ends to the sockets 14.

In accordance with the invention the end sections 10 are formed so that their fluid openings or passages necessitate a minimum increase in the transverse dimensions of the joint. Openings or sockets 15 enter the threaded end parts 13 and join ducts or passages 16. The passages 16 extend laterally from the inner ends of the sockets 15 and then extend axially to join the inner ends of the sockets 14. The portions 17 through which the transverse parts of the passages 16 extend are broadened transversely and are generally square. The passages 16 are correspondingly flattened or broadened where they extend through these portions 17 and are each divided into two ducts by webs 18. Fig. 5 of the drawing illustrates the generally square portions 17 and the web 18 which reinforces the portions 17. The portions 19 of the end sections 10 in which the axially extending parts of the passages 16 are provided are flattened to be horizontally or transversely elongated and generally rectangular. Because of this flattening of the portions 19 the passages 16 may be correspondingly elongated in the transverse direction. In this connection see Fig. 5 which illustrates the cross-sectional configuration of the passage 16. In order to strengthen or reinforce the flattened portions 19 webs 20 extend through their interiors. The webs 20 divide the passages 16 into pairs of ducts. The webs 20 are integral with the walls of the portions 19 and integrally join the webs 18 of the portions 17.

From an inspection of Figs. 1 and 3 of the drawing it will be seen that the divided passages 16 are substantially L-shaped in side view and directly connect the sockets 14 and 15. It will be seen that the broadened flat surfaced portions 19 extend a minimum distance from the longitudinal axis of the joint structure and yet provide ample fluid passages 16 for carrying the fluid. The broadened portions 17 and 19 are shaped to reduce the axial and transverse dimensions of the sections 10 to a minimum and are reinforced by the internal partitions or webs 18 and 20 to have ample strength. Flanges 21 occur on the exteriors of the sections 10 adjacent the threaded end portions 13 and may have squared wings 22.

The intermediate section 11 is an elongate tubular member extending between and connecting the two end sections 10. The section 11 is substantially U-shaped in side elevation having a main elongate portion 23 and laterally projecting legs or stems 24 at the opposite ends of the portion 23. The stems 24 are swingably supported in the sockets 14 by the means 12 to be later described. The stems 24 are parallel cylindrical portions having central longitudinal openings 25 which communicate with the inner ends of the passages 16 of the sections 10.

The main elongate portion 23 of the section 10 is of special construction to extend a minimum distance from the central longitudinal axis of the plane of the joint and yet have full fluid handling capacity. The portion 23 is flattened to be transversely elongated and to have a minimum thickness (see Figs. 4 and 5). The broadened or flattened portion 23 may have a flat outer surface. The outer surface of the portion 23 may be the same distance from the central longitudinal axis or plane of the joint as the flat external surfaces of the portions 19 of the sections 10. This is best illustrated in Figs. 1 and 3 of the drawing. The interior of the elongate tubular portion 23 is divided longitudinally by a bridge or reinforcing web 26 to have two fluid passages 27. The passages 27 extend between and connect the openings 25 and, as best illustrated in Fig. 4 of the drawing, are transversely elongated so that their walls conform generally to the external configuration of the portion 23. The reinforcing web 26 is integral with the walls of the portion 23 and may extend the entire length of the portion. The reinforcing web 26 gives the section 11 ample strength. It is to be observed that the fluid passages of the sections 10 and 11 are directed laterally and then longitudinally to accomplish the desired result with a minimum increase in the total thickness or width of the structure.

The means 12 rotatably or turnably secures the stems 24 of the section 11 in the sockets 14 and thus connects the sections 10 and 11 for relative swinging about spaced parallel axes. As above described the stems 24 are cylindrical and the sockets 14 are shaped and proportioned to receive the stems with clearance. Inwardly facing annular shoulders 30 are provided on the stems 24 in spaced opposing relation to annular shoulders 31 on the walls of the sockets 14. Anti-friction bearings such as ball bearings 32 are provided to connect the sections 10 and 11 for free relative swinging movement. The bearings 32 are arranged in the sockets 14 so that the outer ends of their inner races engage against the shoulders 30. Rings 33 are threaded on the stems 24 and cooperate with the inner ends of the inner races of the bearings. The inner ends of the outer bearing races engage against the shoulders 31. Retaining rings 34 are threaded in the mouths of the sockets 14 and engage the outer ends of the outer races of the bearings 32. It will be seen that the bearings 32 are dependably and positively secured in position and are capable of assuming and transmitting axial thrusts in both directions as well as the radial thrusts. Lock wires or pins 36 prevent unthreading of the rings 34. Annular grooves 37 are provided in the walls of the sockets 14 at the bottoms of the sockets and sealing rings 38 are engaged in the grooves 37 to seal with the stems 24. The sealing rings 38 prevent the leakage of fluid from between the stems 24 and the walls of the sockets 14.

It is believed that the utility and practicability of the swing joint of the present invention will be readily understood from the foregoing detailed description. The sections 10 and 11 are connected for free relative swinging and are formed to have a maximum relative movement. The joint is constructed so that this freedom or relative swinging movement is accomplished with a structure of minimum size. The sections 10 and 11 are formed to occupy a minimum of space and to be light in weight. The parts are constructed to have maximum strength and to have full fluid handling capacity and yet be extremely compact.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. In a swing joint, a section having an axial opening entering it from one end and extending longitudinally of the joint, a socket entering its opposite end portion and extending laterally with respect to the longitudinal axis of the joint, and a duct extending laterally from said opening and then longitudinally of the joint offset from the opening to join the inner end of said socket, and a second tubular section having a stem swingable in said socket and communicating with said duct.

2. A swing joint including two end sections each having an axial opening entering it from one end, a socket entering its opposite end portion with its longitudinal axis transverse with respect to the longitudinal axis of said opening, and a passage extending laterally from said opening and then axially and offset from the opening to join the inner end of said socket, and an intermediate section having laterally projecting stems on its opposite ends rotatably held in said sockets of the end sections and having a passage whose ends communicate with the first named passages at the inner ends of said sockets.

3. A swing joint including two end sections each having an axial opening entering it from one end, a socket entering its opposite end portion with its longitudinal axis transverse with respect to the longitudinal axis of said opening, and a passage extending laterally from said opening and then axially and offset from the opening to join the inner end of said socket, and an intermediate section having an elongate main portion and laterally projecting stems on the opposite ends of the main portion rotatably held in said sockets of the end section, said main portion having a plurality of longitudinal passages and the stems having openings connecting said longitudinal passages with the inner ends of the first named passages.

4. A swing joint including two end sections each having an axial opening entering it from one end, a socket entering its opposite end portion with its longitudinal axis transverse with respect to the longitudinal axis of said opening, and a passage extending laterally from said opening and then axially to join the inner end of said socket, the portions of the passages which extend axially being elongate in transverse cross section so that the parts of the end sections through which they pass extend a minimum distance from the longitudinal axis of the joint, and an intermediate section having a main elongate portion and lateral stems on the ends of the main portion swingably engaged in the sockets of the end sections, the intermediate section having a longitudinal passage whose ends communicate with the first named passages, the portion of said passage which extends through said main portion being elongate in transverse cross section so that the main portion extends a minimum distance from the longitudinal axis of the joint.

5. A swing joint including two end sections each having an axial opening entering it from one end, a socket entering its opposite end portion with its longitudinal axis transverse with respect to the longitudinal axis of said opening, and a passage extending laterally from said opening and then axially to join the inner end of said socket, the portions of the passages which extend axially being elongate in transverse cross section so that the parts of the end sections through which they pass extend a minimum distance from the longitudinal axis of the joint, reinforcing webs extending longitudinally through said portions of the passages to strengthen said parts, and an intermediate section having a main elongate portion and lateral stems on the ends of the main portion swingably engaged in the sockets of the end sections, the intermediate section having a longitudinal passage whose ends communicate with the first named passages, the portion of said passage which extends through said main portion being elongate in transverse cross section so that the main portion extends a minimum distance from the longitudinal axis of the joint, and a reinforcing web extending longitudinally through the passage of said main portion to reinforce said main portion.

6. A swing joint including two end sections each having an opening entering its outer end and extending axially of the joint, a socket entering its inner end portion and extending transversely of the joint and an L-shaped passage connecting the inner end of the opening and the inner end of the socket, the passage being elongate in cross section, reinforcing webs extending longitudinally through the passages to strengthen the end sections, an elongated intermediate section, and stems projecting laterally from the opposite ends of the intermediate section and swingably engaged in said sockets, the intermediate section having a passage which continues through the stems to communicate with the first named passages.

7. A swing joint including two end sections each having an axial opening entering it from one end, a socket entering its opposite end portion with its longitudinal axis transverse to the longitudinal axis of said opening, and a passage extending laterally from said opening and then axially to join the inner end of said socket, the portions of the passages which extend axially being elongate in transverse cross section so that the parts of the end section through which they pass extend a minimum distance from the longitudinal axis of the joint, reinforcing webs extending through said portions of the passages to strengthen said parts, and an intermediate section having a main elongate portion and lateral stems on the ends of the main portion swingably engaged in the sockets of the end sections, the intermediate section having a longitudinal passage whose ends communicate with the first named passages.

8. A swing joint including two end sections each having an axial opening entering it from one end, a socket entering its opposite end portion with its longitudinal axis transverse with respect to the longitudinal axis of said opening, and a passage extending laterally from said opening and then axially and offset from the opening to join the inner end of said socket, and an intermediate section having laterally projecting stems on its opposite ends rotatably held in said sockets of the end sections and having a passage whose ends communicate with the first named passages at the inner ends of said sockets, the main portion of the intermediate section being elongate in transverse cross section and having a longitudinally disposed reinforcing rib joining the sides of said main portion.

9. A swing joint including two end sections each having an opening extending into it from its outer end and being disposed substantially concentric with the longitudinal axis of the joint and having a socket transversely disposed in its inner end portion and having a passage connecting the opening and the inner end of the socket, the passage being offset laterally from the longitudinal axis of the joint, and an intermediate section having an elongate body and laterally disposed stems at the ends of the body rotatably held in the sockets so the body is offset laterally from the longitudinal axis of the joint at a point substantially diametrically opposite the passages of the end sections.

10. A swing joint including two end sections each having an opening extending into it from its outer end and being disposed substantially concentric with the longitudinal axis of the joint and having a socket transversely disposed in its inner end portion and having a passage connecting the opening and the inner end of the socket, the passage being offset laterally from the longitudinal axis of the joint, and an intermediate section having an elongate body and laterally disposed stems at the ends of the body rotatably held in the sockets so the body is offset laterally from the longitudinal axis of the joint at a point substantially diametrically opposite the passages of the end sections, the stems intersecting the longitudinal axis of the joint, the body being located immediately beyond the outer ends of the sockets and the passages being located immediately beyond the inner ends of the sockets.

11. A swing joint including two end sections each having an opening extending into it from its outer end and being disposed substantially concentric with the longitudinal axis of the joint and having a socket transversely disposed in its inner end portion and having a passage connecting the opening and the inner end of the socket, the passage being offset laterally from the longitudinal axis of the joint, and an intermediate section having an elongate body and laterally disposed stems at the ends of the body rotatably held in the sockets so the body is offset laterally from the longitudinal axis of the joint at a point substantially diametrically opposite the passages of the end sections, the stems intersecting the longitudinal axis of the joint, the body being located immediately beyond the outer ends of the sockets and the passages being located immediately beyond the inner ends of the sockets, the body and said passages being flattened in cross section in the direction they are offset from the longitudinal axis of the joint so that the joint is compact in a lateral direction.

12. A swing joint including two end sections each having an axial opening in its outer end, a transversely disposed socket in its inner end and a longitudinally disposed offset passage connecting the opening and socket, an intermediate section having an elongate body and laterally disposed stems at the ends of the body and extending into the sockets, and bearings rotatably mounting the stems in the sockets and being located in substantial alignment with the longitudinal axis of the joint.

DWIGHT M. PHILLIPS.